United States Patent
Taupp

(10) Patent No.: US 9,918,488 B2
(45) Date of Patent: Mar. 20, 2018

(54) METHOD FOR STERILIZING DRINKS CONTAMINATED WITH ACETIC ACID BACTERIA

(71) Applicant: LANXESS Deutschland GmbH, Cologne (DE)

(72) Inventor: Marcus Taupp, Dormagen (DE)

(73) Assignee: LANXESS Deutschland GmbH, Cologne (DE)

(*) Notice: Subject to any disclaimer, the term of this patent is extended or adjusted under 35 U.S.C. 154(b) by 0 days.

(21) Appl. No.: 14/867,587

(22) Filed: Sep. 28, 2015

(65) Prior Publication Data
US 2016/0088866 A1 Mar. 31, 2016

(30) Foreign Application Priority Data
Sep. 29, 2014 (EP) .................... 14186849

(51) Int. Cl.
*A23L 2/44* (2006.01)
*A23L 3/3508* (2006.01)
*A23L 3/3517* (2006.01)
*A23L 3/3535* (2006.01)

(52) U.S. Cl.
CPC .............. *A23L 2/44* (2013.01); *A23L 3/3508* (2013.01); *A23L 3/3517* (2013.01); *A23L 3/3535* (2013.01); *A23V 2002/00* (2013.01)

(58) Field of Classification Search
CPC ........ A23L 2/44; A23L 3/3508; A23L 3/3517; A23L 3/3535; A23V 2002/00
See application file for complete search history.

(56) References Cited

U.S. PATENT DOCUMENTS

| 5,866,182 A * | 2/1999 | Exner ................... A01N 47/06 426/321 |
| 6,136,356 A | 10/2000 | Bunger et al. |
| 8,440,719 B2 | 5/2013 | Kaulen et al. |
| 9,375,030 B2 | 6/2016 | Hoffmann et al. |
| 2013/0129732 A1 | 5/2013 | Laessker et al. |
| 2014/0227405 A1 * | 8/2014 | Beland ..................... A23L 1/09 426/240 |

FOREIGN PATENT DOCUMENTS

WO 96/09774 4/1996

OTHER PUBLICATIONS

Practical winery & vineyard journal ("PM"), title: sulfur dioxide: Science behind this anti-microbial, anti-oxidant wine additive, Jan./Feb. 2009 issue.*
Aneja et al, title: Emerging preservation techniques for controlling spoilage and pathogenic microorganisms in fruit juices, International Journal of microbiology, published Sep. 22, 2014 by Hindawi publishing corporation).*
Yamada, Yuzo et al., "Genera and species in acetic acid bacteria", International Journal of Food Microbiology, 125 (2008, Elsevier B.V., pp. 15-24.
Horsakova, I. et al., "*Asaia* sp. as a Bacterium Decaying the Packaged Still Fruit Beverages", Czech J. Food. Sci., vol. 27, 2009, Special Issue Institute of Chemical Technology, Prague, pp. S362-S365.
Juven, B.J. et al. "Spoilage of Soft Drinks Caused by Bacterial Flocculation", Journal of Food Protection, vol. 48, No. 1, Jan. 1985, International Association of Milk, Food, and Environmental Sanitarians, pp. 52-53.
Kull, F.C., et al. "Mixtures of Quaternary Ammonium Compounds and Long-chain Fatty Acids as Antifungal Agents", Applied Microbiology 9, 1961, pp. 538-541.
Terrell, F.R. et al., "Yeast Inhibition in Grape Juice Containing Sulfur Dioxide, Sorbic Acid, and Dimethyldicarbonate", Journal of Food Science, vol. 5, No. 5, 1993, pp. 1132-1134.
Fisher, Tomeka L. et al., "Survival of *Excherichia coil* 0157:H7 in Apple Cider as Affected by Dimethyl Dicarbonate, Sodium Bisulfite, and Sodium Benzoate", Journal of Food Science, vol. 63, No. 5, 1998, pp. 1-3.
European Search Report from European Application No. 15183138, dated Nov. 12, 2015, 3 pages.

* cited by examiner

*Primary Examiner* — Yanzhi Zhang

(57) ABSTRACT

Synergistically acting mixtures are introduced into drinks for sterilizing and subsequent preservation of drinks which have been contaminated with acetic acid bacteria.

15 Claims, No Drawings

METHOD FOR STERILIZING DRINKS CONTAMINATED WITH ACETIC ACID BACTERIA

The invention relates to a method and the use of synergistically acting mixtures for sterilizing and subsequent preservation of drinks which have been contaminated with acetic acid bacteria.

BACKGROUND INFORMATION

Drinks may be contaminated by microorganisms, which in the end leads to spoilage and uselessness of the product. Furthermore, microbial contamination of drinks represents a health risk to the user. Survival or growth of microorganisms in the drinks is prevented by using chemical preservatives. Germs are increasingly noticeable in drinks, which germs were identified for the first time as causing drink spoilage a little over ten years ago and appear with increasing frequency. These take the form of bacteria which belong to the family of acetic acid bacteria and especially to the genus *Asaia, Neoasaia, Acetobacter, Gluconobacter, Gluconacetobecter* or similar (Yamada, Y. and Yukphan, P., Genera and species in acetic acid bacteria. International Journal of Food Microbiology, 125, 15-24, 2008). It has been increasingly shown that preservatives are not sufficiently potent enough and are therefore used at very high concentrations in order to prevent the bacteria mentioned being able to propagate end thereby accordingly contaminating the drink (Horsakova, I., et al., *Asaia* sp, as a bacterium decaying the packaged still fruit beverages., Czech. Journal of Food Science, 27, 362-365, 2009). The use of high concentrations of preservatives, however, is undesirable from an economic point of view and is limited by statutory regulations.

A preservative composed of potassium sorbate and/or sodium benzoate and dimethyl carbonate and ascorbic acid is known from WO 96/09774 and is suitable for sterilizing and preserving drinks. A disadvantage of this preservative is also that it does not act efficiently against acetic acid bacteria.

The use of sulphur dioxide in high concentrations to control the growth of acetic acid bacteria is known from Watanabe and Ino, 1984 (Watanabe, M. L. and Ino S.; Studies on bacteria isolated from Japanese wine. Part 2. Growth of the *Acetobacter* sp. A-1 during the fermentation and storage of grape must and red wine. Yamanashi-ken Shokuhin Kogyo Shidosho Kenkyu Hokoku 16:13, 1984) and also from Juven, B. J. and Shomen, I., (Juven, B. J. and Shomen, I., Spoilage of soft drinks caused by bacterial flocculation. Journal of Food Protection, 48, 52, 1985). A disadvantage of this method is also that the efficacy is not efficient enough and so high concentrations of sulphur dioxide must be used which frequently negatively affect the flavour of the drink and can cause allergic reactions.

There was therefore a continuing need for a method for sterilizing drinks in which acetic acid bacteria are efficiently removed and the disadvantages of the prior art are overcome.

SUMMARY

It has been found, surprisingly, that the mixture used in accordance with the invention acts against acetic acid bacteria in a synergistic manner and acetic acid bacteria are efficiently controlled.

DESCRIPTION

The invention therefore relates to the use of synergistically acting mixtures comprising a) sorbic acid or benzoic acid and/or alkali metal salts and/or alkaline earth metal salts thereof and
b) dimethyl dicarbonate and
c) sulphur dioxide and/or sulphur dioxide-releasing substances for sterilizing liquids, such as drinks, which have been contaminated by acetic acid bacteria, preferably for the subsequent preservation thereof. In the context of the invention, sterilizing liquids includes neutralizing acetic acid bacteria, which may include killing of the bacteria, and preservation of the liquids includes preventing future growth of acetic acid bacteria in the drinks.

The alkali metal salts of sorbic acid may include sodium sorbate, potassium sorbate and sorbate or mixtures of said salts. The alkaline earth metal salts of sorbic acid may include calcium sorbate or magnesium sorbate or mixtures of said salts. Particular preference is given to using potassium sorbate.

The alkali metal salts of benzoic acid may include sodium benzoate, potassium benzoate and lithium benzoate or mixtures of said salts. The alkaline earth metals salts of benzoic acid may include calcium benzoate or magnesium benzoate or mixtures of said salts. Particular preference is given to using sodium benzoate.

Sulphur dioxide and/or sulphur dioxide-releasing substances may include substances such as inorganic or organic sulphur compounds, with preference given to using inorganic sulphur compounds. The sulphur dioxide-releasing substances may include sodium hydrogen sulphite, sodium disulphite, potassium hydrogen sulphite, potassium disulphite, calcium hydrogen sulphite, calcium disulphite, potassium disulphite or mixtures of the salts. Very particular preference is given to using potassium disulphite as the sulphur dioxide-releasing substance.

Bacteria from the family of acetic acid bacteria are generally gram negative, aerobic bacilli. The type strain of these bacteria is *Acetobacter aceti* and have been assigned meanwhile to novel bacteria of the family of the acetic acid bacteria, mainly in the group of *Asaia* sp. Acetic acid bacteria that may be controlled by the mixtures provided above may include bacteria selected from the following group of *Asaia* sp., *Acetobacter* sp. *Gluconobacter* sp., *Gluconacetobacter* sp., *Saccharibacter* sp., *Swaminanthia* sp., *Acidomonas* sp., *Kozakia* sp., *Neoasaia* sp., *Granulibacter* sp., *Acidocella* sp., *Acidiphilium* sp., *Roseococcus* sp., *Acidosphaera* sp. and *Rhodopila* sp. The mixture particularly preferably has an effect on *Asaia bogorensis, Asaia lannaensis, Gluconobacter oxydans* and *Gluconacetobacter liquefaciens*.

Drinks are preferably understood to mean liquids configured for human or animal consumption. The drinks may include refreshing drinks, such as, and with preference, soft drinks, fruit juices, and fruit juice-containing drinks, flavored refreshing drinks, such as lemonades, teas (so-called ready-to-drink teas), such as, and with preference, iced tea, mixed drinks of a tea/fruit juice-containing refreshing drink, but also corresponding concentrates, and also wine coolers, and non-alcoholic wines. Particular preference is given to iced tea drinks.

The sorbic acid and/or alkali metal and/or alkaline earth metal salts thereof are generally used in an amount of 50 ppm to 1000 ppm, based on the amount of drink to be sterilized, but can also be used in smaller or larger concentrations. The amount of sorbic acid and/or alkali metal and/or alkaline earth metal salts thereof used is preferably between 100 ppm and 350 ppm, based on the amount of drink to be sterilized. Benzoic acid and/or alkali metal and/or alkaline earth metal salts thereof are generally used in an amount of 50 ppm to 1000 ppm, based on the amount of drink to be sterilized, but can also be used in smaller or larger concentrations. The amount of benzoic acid and/or alkali metal and/or alkaline earth metal salts thereof used is preferably between 100 ppm and 350 ppm, based on the amount of drink to be sterilized. DMDC is generally used in an amount of 50 ppm to 1000 ppm, based on the amount of drink to be sterilized, but can also be used in smaller or larger amounts. The amount of DMDC used is preferably between 75 ppm and 250 ppm, based on the amount of drink to be sterilized.

The sulphur dioxide and/or the sulphur dioxide-releasing substances are generally used in an amount of greater than 0 ppm up to 500 ppm, but can likewise be used in higher concentrations. The sulphur dioxide and/or the sulphur dioxide-releasing substances are preferably used in an amount of 5 ppm to 100 ppm, based on the amount of drink to be treated. The sulphur dioxide and/or the sulphur dioxide-releasing substances are more preferably used at a concentration of 5 ppm to 20 ppm, based on the amount of drink to be treated.

Very particular preference is given to using a mixture of potassium sorbate and/or sodium benzoate and dimethyl dicarbonate and potassium disulphite. This mixture acts particularly synergistically. Very particular preference is given to using potassium sorbate and/or sodium benzoate at a concentration of 100 ppm to 350 ppm, and dimethyl dicarbonate at a concentration of 100 ppm to 250 ppm, and potassium disulphite at a concentration of 5 ppm to 100 ppm, in the drink to be sterilized.

Contamination by acetic acid bacteria is understood to mean in accordance with the invention that the detection methods known from the prior art to those skilled in the art give rise to a significant level of detection of acetic acid bacteria in the drinks. The detection of a bacterium carried out according to these methods is already a contamination in the context of the invention.

Since the use according to the invention also relates to the incorporation of the compounds in the drinks to be sterilized, the invention likewise relates to a method for sterilizing drinks which have been contaminated by acetic acid bacteria, in which a) sorbic acid or benzoic acid and/or alkali metal salts and/or alkaline earth metal salts thereof and
b) dimethyl dicarbonate and
c) sulphur dioxide and/or sulphur dioxide-releasing substances are incorporated into the drinks.

The incorporation may be effected for example by separate addition of the compounds a), b) and c) in any sequence or by addition of these compounds in a mixture. This mixture may be diluted by further solvent or also by other additives such as emulsifiers or other suitable food additives. Hydrophilic, organic and water-miscible solvents may be used as solvent. Preferably, no additional solvent is added. The compounds are preferably incorporated separately into the drinks.

Preservation by the preservatives added preferably occurs after the sterilization of the drinks.

The mixture used in accordance with the invention acts in a synergistic manner against acetic acid bacteria. Drinks can be efficiently and cost-effectively sterilized and preserved in this manner.

EXAMPLES

A drink was contaminated with a particular amount of a mixture of microorganisms and a mixture of preservatives was investigated for efficacy compared to the individual substances. The mixture of bacteria is composed of *Asaia bogorensis, Asaia lannaensis, Gluconobacter oxydans* and *Gluconacetobacter liquefaciens*. After one week, a portion of the drink was investigated for the presence of microorganisms.

Individual test substances: potassium sorbate, dimethyl dicarbonate, sodium benzoate, potassium disulphite
Test bacteria: mixture of various acetic add bacteria isolated from drink filling lines
Substrate: iced tea
Bacterial seeding per mL of substrate: 200 cfu/mL per bacterium in the mixture

TABLE 1

|  | MIC ppm after one week | Synergy Index |
|---|---|---|
| Individual active ingredient | | |
| Potassium sorbate | 750 mg/L | |
| Dimethyl dicarbonate | 300 mg/L | |
| Potassium disulphite | 60 mg/L | |
| Active ingredient mixture | | |
| Potassium sorbate | 150 mg/L | SI = 0.87 |
| Dimethyl dicarbonate | 150 mg/L | |
| Potassium disulphite | 10 mg/L | |
| Individual active ingredient | | |
| Sodium benzoate | 550 mg/L | |
| Dimethyl dicarbonate | 300 mg/L | |
| Potassium disulphite | 60 mg/L | |
| Active ingredient mixture | | |
| Sodium benzoate | 125 mg/L | SI = 0.92 |
| Dimethyl dicarbonate | 175 mg/L | |
| Potassium disulphite | 7.5 mg/L | |

The synergism was determined using the method described by Kull et al. (F. C. Kull, P. C. Eismann, H. D. Sylvestrowicz, R. L. Mayer, Applied Microbiology 9, 538 to 541, 1961). The following relationships apply:

$$QA/Qa + QB/Qb + QC/Qc = SI$$

Qa=concentration of substance A which is the MIC
Qb=concentration of substance B which is the MIC
Qc=concentration of substance C which is the MIC
QA=concentration of substance A in the concentration of A/B/C at which microbial growth is suppressed
QB=concentration of substance B in the concentration of A/B/C at which microbial growth is suppressed
QC=concentration of substance C the concentration of A/B/C at which microbial growth is suppressed
SI=Synergy Index
SI=1 means additivity
SI>1 means antagonism
SI<1 means synergism

What is claimed is:

1. A method for sterilizing beverages contaminated by acetic acid bacteria, the method comprising:
    introducing components for neutralizing acetic acid bacteria into a beverage, the components comprising synergistically acting components comprising:
    a) at least one of: sorbic acid, benzoic acid, an alkali metal salt of sorbic acid, an alkali metal salt of benzoic acid, an alkaline earth metal salt of sorbic acid, and an alkaline earth metal salt of benzoic acid;

b) dimethyl dicarbonate; and
c) at least one of: sulphur dioxide and sulphur dioxide-releasing substances,
wherein, based on the amount of beverage to be treated, the synergistically acting components are introduced into the beverage to provide concentrations of:
100 ppm to 350 ppm of the at least one of: sorbic acid, benzoic acid, alkali metal salt of sorbic acid, alkali metal salt of benzoic acid, alkaline earth metal salt of sorbic acid, and alkaline earth metal of benzoic acid;
75 ppm to 250 ppm of the dimethyl dicarbonate; and
5 ppm to 100 ppm of the at least one of: the sulphur dioxide and the sulphur dioxide-releasing substances, and
synergistically neutralizing acetic acid bacteria in the beverage.

2. The method according to claim 1, wherein the alkali metal salt is at least one of: sodium sorbate, potassium sorbate and lithium sorbate, and the alkaline earth metal salt is calcium sorbate.

3. The method according to claim 1, wherein the alkali metal salt is at least one of: sodium benzoate, potassium benzoate and lithium benzoate, and the alkaline earth metal salt is calcium benzoate.

4. The method according to claim 1, wherein the sulphur dioxide-releasing substances are selected from a group consisting of sodium hydrogen sulphite, sodium disulphite, potassium hydrogen sulphite, potassium disulphite, calcium hydrogen sulphite, calcium disulphite, and mixtures thereof.

5. The method according to claim 1, wherein the synergistically acting components are:
a) at least one of potassium sorbate and sodium benzoate;
b) dimethyl dicarbonate; and
c) potassium disulphite.

6. The method of claim 1, wherein, based on the amount of beverage to be treated, the synergistically acting components are introduced into the liquid to provide concentrations of:
100 ppm to 250 ppm of the dimethyl dicarbonate; and
5 ppm to 20 ppm of the at least one of: the sulphur dioxide and the sulphur dioxide-releasing substances.

7. The method of claim 1, wherein the beverages comprise at least one of: iced teas, sports drinks, fruit juices, and fruit juice-containing drinks.

8. The method of claim 1, wherein the acetic acid bacteria are selected from the group consisting of: *Asaia* sp., *Acetobacter* sp., *Gluconobacter* sp., *Gluconacetobacter* sp., *Saccharibacter* sp., *Swaminanthia* sp., *Acidomonas* sp., *Kozakia* sp., *Neoasaia* sp., *Granulibacter* sp., *Acidocella* sp., *Acidiphilium* sp., *Roseococcus* sp., *Acidosphaera* sp., and *Rhodopila* sp.

9. The method according to claim 1, wherein:
the beverages comprises at least one of: iced teas, sports drinks, fruit juices, and fruit juice-containing drinks;
the acetic acid bacteria are selected from the group consisting of: *Asaia bogorensis, Asaia lannaensis, Gluconobacter oxydans* and *Gluconacetobacter liquefaciens,* and
the synergistically acting components comprise:
a) at least one of potassium sorbate and sodium benzoate;
b) dimethyl dicarbonate; and
c) potassium disulphite.

10. The method of claim 1, wherein the compounds a), b) and c) are added into the liquid individually, in any sequence.

11. The method of claim 1, wherein the compounds a), b) and c) are premixed together and subsequently added to the liquid as a mixture.

12. The method according to claim 1, wherein components added to the beverage do not include ascorbic acid.

13. The method according to claim 1, wherein the synergistically acting components consist of:
the at least one of: sorbic acid, benzoic acid, an alkali metal salt of sorbic acid, an alkali metal salt of benzoic acid, an alkaline earth metal salt of sorbic acid, and an alkaline earth metal salt of benzoic acid;
the dimethyl dicarbonate; and
the at least one of: sulphur dioxide and sulphur dioxide-releasing substances.

14. The method according to claim 1, wherein the method consists of neutralizing acetic acid bacteria in a beverage by introducing the components for neutralizing acetic acid bacteria into the beverage, wherein the components for neutralizing acetic acid bacteria consist of:
a) at least one of: sorbic acid, benzoic acid, an alkali metal salt of sorbic acid, an alkali metal salt of benzoic acid, an alkaline earth metal salt of sorbin acid, and an alkaline earth metal salt of benzoic acid;
b) dimethyl dicarbonate; and
c) at least one of: sulphur dioxide and sulphur dioxide-releasing substances,
wherein, based on the amount of beverage to be treated, the synergistically acting components are introduced into the beverage to provide concentrations of:
100 ppm to 350 ppm of the at least one of: sorbic acid, benzoic acid, alkali metal salt of sorbic add, alkali metal salt of benzoic acid, alkaline earth metal salt of sorbic add, and alkaline earth metal of benzoic acid;
75 ppm to 250 ppm of the dimethyl dicarbonate; and
5 ppm to 100 ppm of the at least one of: the sulphur dioxide and the sulphur dioxide-releasing substances, and synergistically neutralizing acetic add bacteria in the beverage.

15. A method for sterilizing and preserving beverages against acetic acid bacteria, the method comprising introducing:
a) at least one of: sorbic acid, benzoic acid, an alkali metal salt of sorbic acid, an alkali metal salt of benzoic acid, an alkaline earth metal salt of sorbic acid, and an alkaline earth metal salt of benzoic acid to a concentration of 100 ppm to 350 ppm thereof;
b) dimethyl dicarbonate to a concentration of 75 ppm to 250 ppm thereof; and
c) at least one of: sulphur dioxide and sulphur dioxide-releasing substances to a concentration of 5 ppm to 100 ppm thereof,
into a drink to neutralize, if present, any acetic acid bacteria in the beverage and prevent future growth of acetic acid bacteria in the beverage.

* * * * *